(12) United States Patent
Harper et al.

(10) Patent No.: US 9,540,791 B2
(45) Date of Patent: Jan. 10, 2017

(54) COMPUTER-IMPLEMENTED METHOD FOR PROVIDING A WARNING

(71) Applicant: J.C. Bamford Excavators Limited, Uttoxeter, Staffordshire (GB)

(72) Inventors: Lee Harper, Uttoxeter (GB); Phil Layton, Uttoxeter (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 0 days.

(21) Appl. No.: 14/791,227

(22) Filed: Jul. 2, 2015

(65) Prior Publication Data

US 2016/0002890 A1 Jan. 7, 2016

(30) Foreign Application Priority Data

Jul. 2, 2014 (GB) .................................. 1411799.8

(51) Int. Cl.
| | | |
|---|---|---|
| *E02F 9/24* | (2006.01) | |
| *E02F 9/26* | (2006.01) | |
| *B66C 23/88* | (2006.01) | |
| *B66F 17/00* | (2006.01) | |
| *G05B 11/01* | (2006.01) | |
| *E02F 3/32* | (2006.01) | |
| *E02F 3/96* | (2006.01) | |

(52) U.S. Cl.
CPC ............... *E02F 9/245* (2013.01); *B66C 23/88* (2013.01); *B66F 17/00* (2013.01); *E02F 9/261* (2013.01); *G05B 11/01* (2013.01); *E02F 3/325* (2013.01); *E02F 3/964* (2013.01)

(58) Field of Classification Search
CPC ............ E02F 9/245; E02F 9/261; E02F 3/325; E02F 3/964; G05B 11/01; B66F 17/00; B66C 23/88

USPC ........................................................ 701/33.7
See application file for complete search history.

(56) References Cited

U.S. PATENT DOCUMENTS

| | | |
|---|---|---|
| 6,317,691 B1 | 11/2001 | Narayan et al. |
| 2004/0210370 A1 | 10/2004 | Gudat et al. |
| 2005/0283294 A1 | 12/2005 | Lehman et al. |
| 2008/0077299 A1 | 3/2008 | Arshad et al. |
| 2008/0125942 A1* | 5/2008 | Tucker ................ A01B 69/008 701/50 |

(Continued)

FOREIGN PATENT DOCUMENTS

| | | |
|---|---|---|
| EP | 1229345 A2 | 8/2002 |
| EP | 2562312 A2 | 2/2013 |

(Continued)

OTHER PUBLICATIONS

Search Report for GB 1411799.8, dated Dec. 19, 2014.
Partial European Search Report for European Patent Application No. 15174738.3, dated Nov. 24, 2015.

*Primary Examiner* — Brian P Sweeney
(74) *Attorney, Agent, or Firm* — Marshall, Gerstein & Borun LLP

(57) ABSTRACT

A computer-implemented method for providing a warning including the steps: obtaining data relating to the location of a hazardous object and obtaining data relating to the location of a material handling machine. The computer to compare the location of the material handling machine to the location of the hazardous object and estimates a probability of a hazardous event occurring. If the estimate exceeds a threshold valve, a warning is issued by the computer.

20 Claims, 5 Drawing Sheets

(56) References Cited

U.S. PATENT DOCUMENTS

2008/0312833 A1 12/2008 Greene et al.
2012/0287277 A1 11/2012 Koehrsen et al.
2012/0327261 A1 12/2012 Tafazoli Bilandi et al.

FOREIGN PATENT DOCUMENTS

| JP | H02285113 A | 11/1990 |
| WO | WO-03/087720 A1 | 10/2003 |
| WO | WO-2008/066654 A1 | 6/2008 |
| WO | WO-2008/113098 A1 | 9/2008 |
| WO | WO-2011/031252 A1 | 3/2011 |

* cited by examiner

COMPUTER-IMPLEMENTED METHOD FOR PROVIDING A WARNING

FIELD OF THE INVENTION

The present invention relates to a computer-implemented method for providing a warning.

BACKGROUND OF THE INVENTION

Known material handling machines such as excavators have a material handling arm assembly. The arm assembly may have an arm, known as a boom, pivotally mounted about a generally horizontal axis relative to a chassis of the machine. A further arm, known as a dipper, may be attached to an end of the boom remote from the chassis and may be pivotable about a generally horizontal axis. A material handling implement such as a bucket may be pivotably mounted on an end of the dipper. The boom may be raised and lowered by operation of a first hydraulic ram. The dipper may be moveable relative to the boom by operation of a second hydraulic ram, the bucket may be moveable relative to the dipper by operation of a third hydraulic ram.

Public utility systems may be run underground, as in the case of telephone lines, fiber optic cables, water mains, wastewater pipes and gas pipes, or above ground level, as in the case of electricity cables. Such cables and pipes may be damaged during operation of a material handling machine, for example when the bucket of a material handling machine is lowered to dig a trench it may penetrate or sever a cable or pipe, or when it is raised to move material from one location to another it might sever an overhead cable. This damage may result in disruption to the supply of a utility or service and the consequent expense of repairing or replacing the cable or pipe. In the case of damage to gas pipes, the result may be a catastrophic explosion, causing fatalities.

The risk of damage to high pressure gas pipes (for example pipes having a diameter of 1 meter) in the United Kingdom is reduced by continual aerial surveillance of pipelines. This requires helicopters to be flown along the length of pipelines and a pilot to monitor the use of excavators or the like in the vicinity of the pipelines. If a pilot sees an excavator or the like in operation in close proximity to a pipeline, the helicopter is landed and the operator of the machine is instructed to move out of the area.

BACKGROUND OF THE INVENTION

Accordingly, there is a need for an improved method for providing a warning.

Known systems enable data to be collected from material handling machines such as excavators, back hoe loaders (BHL), tele-handlers etc. in real time. Examples of the data that can be collected include the type of a machine, the location of the machine, the engine speed and the fuel levels of the machine.

This data is transmitted to a computer and processed by algorithms to provide information about one or more machines in a fleet, for example where a particular machine is or was located at any given time, the number of hours a machine has been working (or has been idle).

A user can also create and download reports from the website and register to receive notifications, for example that a machine has completed a number of working hours and should be serviced or that a machine appears to have a fault that should be investigated. These notifications are displayed within the website and so a user needs to log into the website to see them. A user may also register to receive these notifications via electronic mail.

The information about material handling machines can also be used to monitor the location of machines. Algorithms within a system compare the location of a machine with the co-ordinates of a geo-fence (that has been established to demarcate a site on which the machine is located) and, if the machine is moved outside the geo-fence a user is notified either via a notification on the secure website or via email, as described above. Alternatively a text message may be sent to the owner of a machine.

The information contained in the website, email and text notifications is restricted to information about the material handling machine itself.

According to an aspect of the present invention there is provided a computer-implemented method for providing a warning including the steps:

obtaining data relating to the location of an object, obtaining data relating to the location of a material handling machine;

using the computer to compare the location of the material handling machine to the location of the object in order to estimate a probability of damage occurring; and providing a warning based on the estimate.

The machine may be located remotely from the computer.

The machine may include the computer.

The warning may be received at a location remote from the computer and/or remote from the machine.

The warning may be received at the machine.

The machine may include the computer and the warning may be received at the machine.

The location of the object may be below ground level. The location of the object may be above ground level.

The method may further include obtaining data relating to the distance of the object below or above the ground level and using this data to estimate the probability of damage occurring.

The method may further include using a communication system.

The communication system may communicate the data relating to the location of the object to the computer.

The communication system may communicate the data relating to the location of the material handling machine to the computer.

The communication system may communicate the warning.

The communication system may communicate the warning to and/or from the material handling machine.

The material handling machine may be an excavator, or a backhoe loader, or a tele-handler.

The material handling machine may have a material handling implement, for example a ground-engaging material handling implement.

The method may further include determining the position of the material handling implement relative to the rest of the material handling machine, preferably the height of the material handling implement relative to the rest of the material handling machine, and using this data to estimate the probability of the damage occurring.

The method may further include determining if the material handling machine is moving, preferably the speed and/or direction at which the material handling machine is moving, and using this data to estimate the probability of the damage occurring.

The method may further include determining the type of the material handling machine, and using this data to estimate the probability of the damage occurring.

The material handling machine may have an engine and the method may include determining if the engine is running, preferably the speed at which the engine is running, and using this data to estimate the probability of the damage occurring.

The material handling machine may have a hydraulic system that manoeuvers the material handling implement and the method may include determining the pressure in the hydraulic system and using this data to estimate the probability of the damage occurring.

The warning may include an alarm, for example an audible, visual or vibration alarm.

The warning may include sending a message containing data about the estimate of the probability of damage occurring to and/or from the material handling machine.

According to an aspect of the present invention there is provided a material handling machine including a processor that is configured to receive data relating to the location of an object and data relating to the location of the material handling machine; to compare the location of the material handling machine and the location of the object; to estimate a probability of damage occurring; and to provide a warning based on the estimate.

According to an aspect of the present invention there is provided a system for providing a warning including a processor that is configured to receive data relating to the location of an object and data relating to the location of a material handling machine; to compare the location of the material handling machine and the location of the object; to estimate a probability of damage occurring, and to provide a warning based on the estimate.

According to an aspect of the present invention there is provided a computer program product which when executed on a processor causes the processor to execute the steps of:
  comparing data relating to the location of an object and data relating to the location of a material handling machine;
  estimating the probability of damage occurring; and
  providing a warning based on the estimate.

BRIEF DESCRIPTION OF THE DRAWINGS

The invention will now be described, by way of example only, with reference to the accompanying drawings in which.

DETAILED DESCRIPTION

Figure 1:
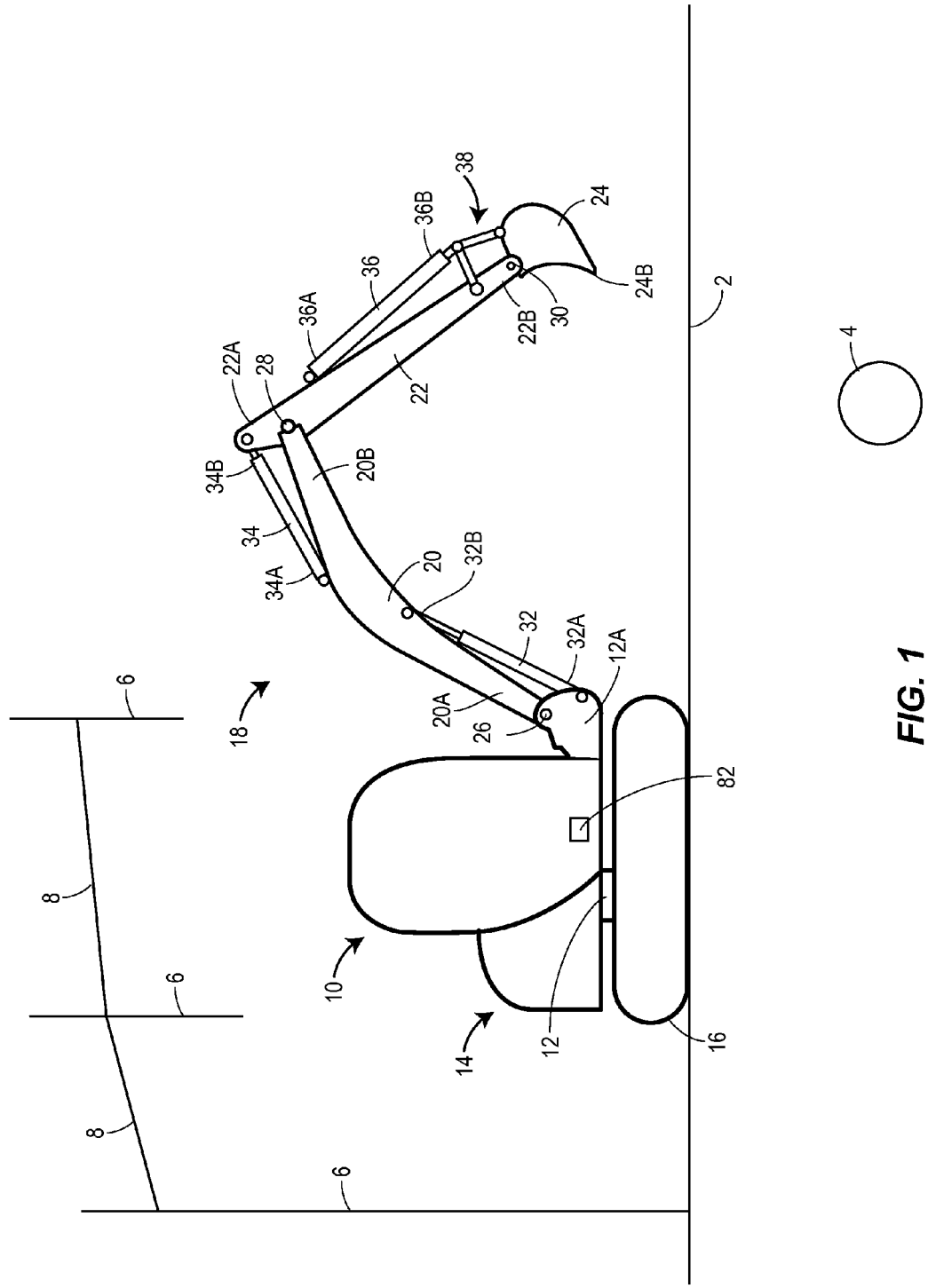
FIG. 1 is a schematic side view of a material handling machine for use in a method according to the present invention.
Figure 2:
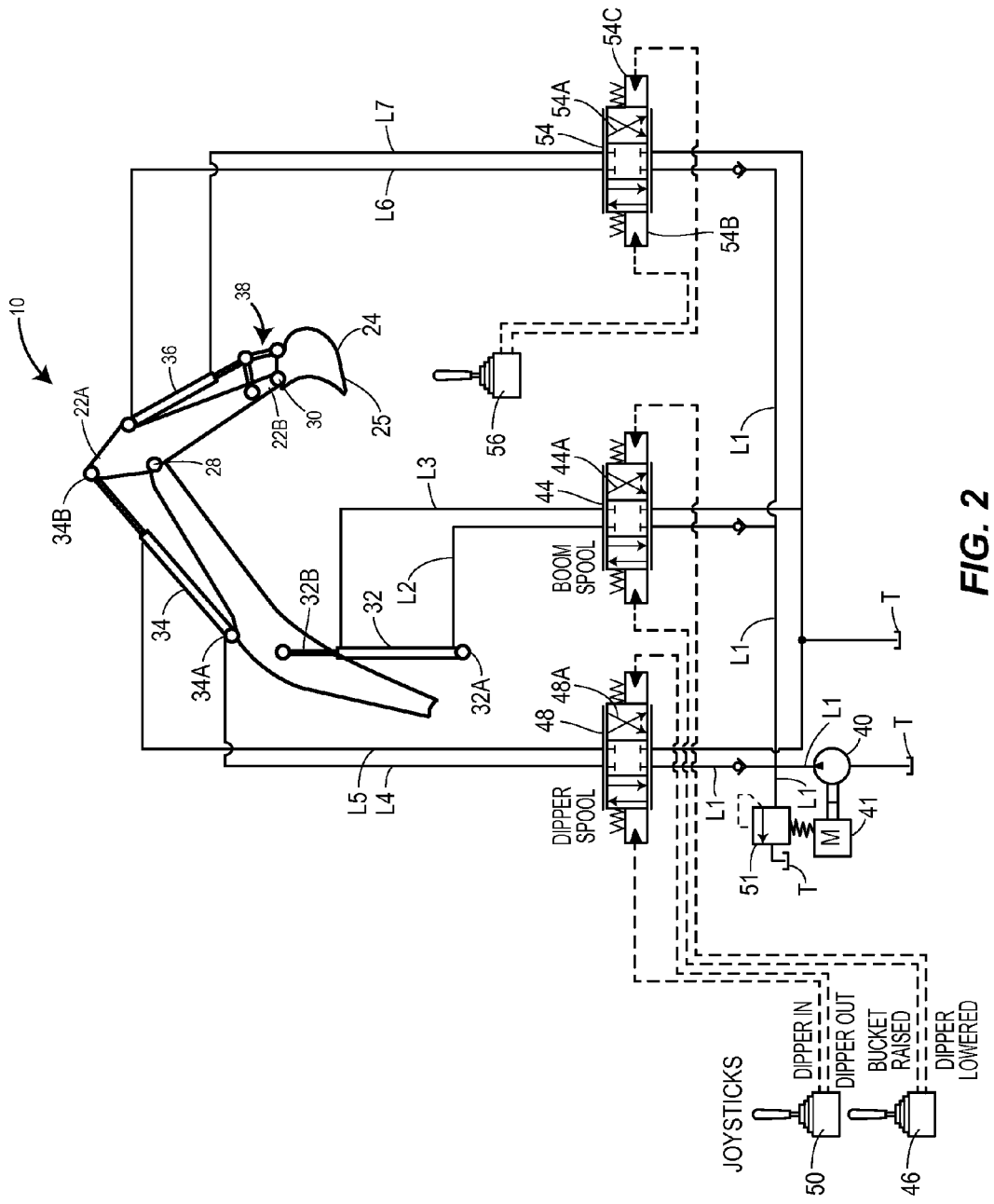
FIG. 2 is a schematic view of part of the material handling machine of FIG. 1.

With reference to FIGS. 1 and 2 there is shown a material handling machine 10 which in this example is an excavator including a chassis 12 and an operator cab 14. The operator cab 14 is mounted on the chassis 12. Ground engaging transport means in the form of a pair of tracks 16 are provided to move the machine over the ground.

Attached to the chassis is an arm assembly 18 (also known as an implement support system), the arm assembly includes a first arm in the form of a boom 20, a second arm in the form of a dipper 22 and a ground engaging implement in the form of a bucket 24. The boom 20 is pivotally mounted by pivot 26 to link 12A at a first end 20A of the boom. Link 12A is pivotally mounted at a generally vertical axis relative to the chassis 12. Pivot 26 is orientated horizontally. The dipper is pivotally mounted via pivot 28 to a second end 20B of the boom 20. Pivot 28 is orientated horizontally. The bucket is pivotally mounted via pivot 30 to an end 22B of dipper 22 remote from end 22A of dipper 22. Pivot 30 is orientated horizontally.

A first hydraulic actuator in the form of a first hydraulic ram 32 has a first end 32A pivotally attached to the chassis 12 and a second end 32B pivotally attached to the boom part way between the first and second ends of the boom. A second hydraulic actuator in the form of a second hydraulic ram 34 has a first end 34A pivotally attached to the boom part way between the first and second ends of the boom and a second end 34B pivotally attached to the dipper proximate the first end 22A of the dipper. A third hydraulic actuator in the form of a third hydraulic ram 36 has a first end 36A pivotally attached to the dipper proximate the first end 22A of the dipper and a second end 36B pivotally attached to a linkage mechanism 38 proximate the second end of the dipper. The linkage mechanism 38 per se is known and simply converts extension and retraction movement of the third hydraulic ram 36 into rotary movement of the bucket 24 about pivot 30.

Extension of the first hydraulic ram causes the boom to raise, and contraction of the first hydraulic ram causes lowering of the boom. Extension of the second ram causes the dipper to pivot in a clockwise direction (when viewing FIG. 1) about pivot 28, i.e. causes the boom to move in a "dipper in" direction, and retraction of the second hydraulic ram 34 causes the dipper to move in an anticlockwise direction when viewing FIG. 1 about pivot 28, i.e. in a "dipper out" direction. Extension of the third hydraulic ram 36 causes the bucket 24 to move in a clockwise direction about pivot 30, i.e. in a "crowd" direction, and retraction of the third hydraulic ram 36 causes the bucket to move in an anticlockwise direction about pivot 30, i.e. in a "dump" direction.

The first, second and third hydraulic rams are all double acting hydraulic rams. Double acting hydraulic rams are known per se. They include a piston within a cylinder. The piston is attached to a rod which extends beyond the end of the cylinder. The end of the rod remote from the piston defines one end of the hydraulic ram. The end of the cylinder remote from the rod defines an opposite end of hydraulic ram. A "head side chamber" is defined between the piston and the end of the cylinder remote from the rod. A "rod side chamber" is defined between the piston and the end of the cylinder proximate the end of the rod. Pressurization of the head side pressure chamber extends the ram and pressurization of the rod side chamber causes the ram to retract.

The machine includes a system for operating the first, second and third hydraulic rams, as described below.

A hydraulic pump 40 driven by a prime mover 41. Prime mover 41 may be an internal combustion engine, though other prime movers are suitable. A boom spool valve 44 can be operated by an operator manipulating boom control 46. In this case boom control 46 is a joystick. A dipper spool 48 valve can be controlled via a dipper control 50. In this case dipper control 50 is a joystick. An implement spool valve 54 can be operated by an operator manipulating implement control 56. In this case implement control 56 is a joystick. Joysticks 50, 46 and 54 may be separate joysticks (as shown in FIG. 2). Alternatively two of the dipper control, implement control and boom control may be combined in a single joystick. Alternatively all three of the dipper control, boom control and implement control may be combined in a single joystick. Controls other than joysticks may be used to control one or more of the dipper spool, the boom spool or the implement spool.

The machine is positioned on the ground 2 and is operating near an underground pipeline 4 and near overhead cables 8 supported via poles or pylons 6.

Operation of a material handling machine is as follows:

The prime mover 41 drives the hydraulic pump 40 which takes hydraulic fluid from tank T and pressurizes hydraulic line L1. As shown in FIG. 2 the dipper spool valve is closed the implement spool valve 54 is closed and the boom spool valve is closed and hence pressurized fluid in line L1 will pass through the relief valve 51 back to tank T.

If it is desired to raise the boom the boom control 46 is operated such that the boom spool 44A of the boom spool valve 44 is moved so as to connect hydraulic line L1 and L2. This causes hydraulic fluid to pass into the head side pressure chamber of the first hydraulic ram thereby extending the hydraulic ram and raising the boom. Hydraulic fluid from the rod side chamber passes into hydraulic line L3 and back to tank T via the boom spool valve 44. In order to lower the boom the boom control 46 is operated to move the boom spool 44A in the opposite direction thereby connecting hydraulic line L1 with L3 and hydraulic line L2 with tank T.

In order to move the dipper in a "dipper in" direction the dipper control 50 is operated such that the dipper spool 48A of the dipper spool valve 48 connects line L1 with hydraulic line L4. Hydraulic line L4 is connected to the head side of the hydraulic ram 34 which causes the ram to extend thereby pivoting the dipper arm in a clockwise direction about pivot 28. Hydraulic fluid in the rod side of hydraulic ram 34 passes into line L5 and then on through the dipper spool valve 48 to tank T. In order to move the dipper in a "dipper out" direction the dipper control 50 is operated such that the dipper spool connects line L1 with L5 and connects line L4 to tank. This results in retraction of the hydraulic ram 34 thereby causing the dipper to move in an anticlockwise direction about pivot 28.

In order to move the bucket in a "crowd" direction the implement control 56 is operated such that the implement spool 54A of the implement spool valve 54 connects line L1 with hydraulic line L6. Hydraulic line L6 is connected to the head side of the hydraulic ram 36 which causes the ram to extend thereby pivoting the implement in a clockwise direction about pivot 30. Hydraulic fluid in the rod side of hydraulic ram 36 passes into line L7 and then on through the implement spool valve 54 to tank T. In order to move the bucket in a "dump" direction the implement control 56 is operated such that the implement spool 54A connects line L1 with L7 and connects line L6 to tank. This results in retraction of the hydraulic ram 36 thereby causing the bucket to move in an anticlockwise direction about pivot 30.

When digging a trench or the like a typical sequence of movements of the arm assembly is as follows:

Firstly, the boom is lowered and the dipper is moved in a "dipper out" direction thereby moving the bucket teeth 25 of the bucket 24 away from the chassis 12. The boom is then further lowered such that the bucket teeth 25 engage the ground. The bucket is then crowded slightly so as to start to move the bucket teeth through the ground. The dipper control 50, boom control 46 and bucket control (not shown) are then simultaneously operated to progressively move the dipper in "dipper in" direction and to move the boom in a "boom raised" direction and to move the bucket in a "crowd" direction such that the bucket teeth move generally towards the chassis. As will be appreciated, skill is involved in simultaneously manipulating the dipper control 50 and the boom control 46 and the bucket control 56 to efficiently fill the bucket with ground material. Once the bucket is full, the boom is raised, the arm assembly is swung laterally relative to the machine and the ground material is then dumped by moving the bucket to a dumped position. The sequence is then repeated.

Figure 3:
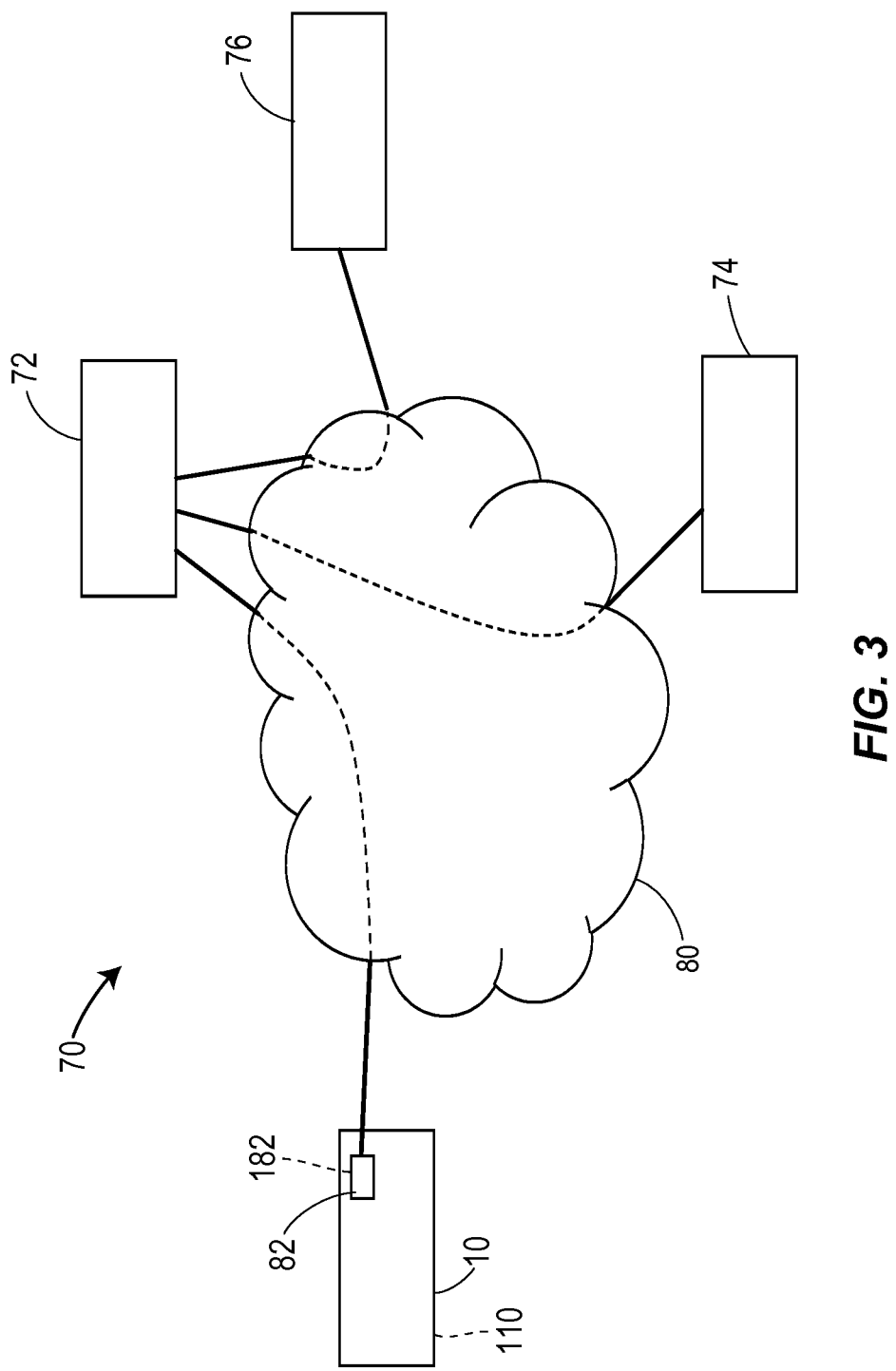
FIG. 3 shows a system architecture for implementing a method according to a first embodiment of the present invention.

With reference to FIG. 3 there is shown a system architecture for a method according to the present invention. The system 70 includes a computer 72, a database 74, a wide area network 80 (for example the internet) and the material handling machine 10.

The computer 72 includes a processor. The computer 72 can generate a warning as will be described further below.

The database 74 includes information relating to the location of one or more objects. The object may be a utility service such as a telephone line, a fiber optic cable, a water main, a water waste pipe, or a gas pipe. Alternatively, the object may be electricity pylon cables, high pressure gas pipe, an oil pipe, or the like. Certain of these objects are hazardous objects, since if damaged a hazardous event may occur. Other of these objects (for example underground fiber optic cables), are not hazardous, in as much as the damage to a fiber optic cable does not create a hazard for people in the immediate vicinity, rather it produces inconvenience for people attempting to use the cable and incurs a cost for the repair of the cable.

The wide area network 80 provides a backbone for communication within the system 70.

The material handling machine 10 includes a monitoring unit 82 that collects data from the machine 10, including the type of the machine 10, the location of the machine 10, the engine speed of the machine 10 and the pressure of oil in the hydraulic system of the machine 10. The monitoring unit 82 includes a Global Navigation Satellite System (GNSS), for example a Global Positioning System (GPS) tracking unit. The GPS tracking unit enables the precise location of the machine 10 to be determined.

The monitoring unit 82 is connected to the computer 72 via the wide area network 80.

The database 74 is connected to the computer 72 via the wide area network 80.

Operation of the system 70 is as follows:

The monitoring unit 82 transmits information relating to the type of the machine 10, the precise location of the machine 10, the engine speed of the machine 10 and the pressure of oil in the hydraulic system of the machine 10 from the machine 10 to the computer 72 via the wide area network 80.

The processor within the computer 72 uses one or more algorithms to determine further information about the machine.

The computer 72 receives information relating to the location of one or more objects from database 74.

The computer 72 can then compare information relating to the machine with information relating to the location of one or more objects and can then make an estimation of probability of the machine damaging the object and issue a warning based on such an estimate.

EXAMPLE 1

The computer 72 receives information from the database 74 concerning an object, in this case an underground gas pipeline 4. The position of the pipeline is communicated to computer 72 together with its depth below ground, in this example two meters below ground.

The computer 72 receives information from machine 10 concerning the machine type, the machine position, the engine speed of the machine and the pressure in the hydraulic circuit of the machine. Some of this information is periodically updated, in particular the position of the machine, the engine speed and the hydraulic circuit pressure. Period updates of this information are transmitted to the computer 72 once per second, though information update can be more frequent or less frequent than this.

The computer 72 can determine the type of machine and therefore can determine that the machine 10 is an excavator. In particular the computer 72 can determine that this type of excavator has a working arm that can reach three meters below ground. Thus, the computer 72 can determine that machine 10 is capable of digging a hole deep enough for the bucket 24 to strike the pipeline 4.

Computer 72 can determine that the machine 10 is located near the pipeline. Because the information relating to the position of the machine is periodically updated, the computer can determine whether or not the machine is moving over the ground. In this case the machine is stationary, i.e. it is not moving over the ground.

The computer 72 can determine that the engine of the machine 10 is running and that the engine speed is relatively high. Due to the periodic updates the computer can determine whether the engine speed changes with time, in this example the engine speed is relatively high and stays at that relatively high level for a period of time.

Due to the periodic updates the computer can monitor the hydraulic pressure and determine how it changes with time. In this case the oil pressure in the hydraulic system is being varied with time.

The computer uses an algorithm to process this data to determine that the excavator is digging the ground since an excavator which is stationary with an engine speed that is relatively high and relatively constant and with an oil pressure in the hydraulic system which is varying with time is indicative of the excavator digging the ground.

Accordingly, the computer 72 can determine that the machine 10 is digging ground near the pipeline 4. Whilst computer 72 cannot determine the depth below ground that the bucket of the machine 10 is working at, nevertheless because the bucket of machine 10 can reach down to a depth (3 meters) that is deeper than the depth of the pipeline (2 meters) there is a raised probability that damage to the pipeline from the bucket of the excavator might occur. Under these circumstances the computer 72 issues a warning to the operator 76 in charge of the pipeline. The operator 76 can then instruct someone to travel to the location of the machine 10 (either by helicopter or car etc.) to instruct the operator of the machine 10 to stop digging in that area.

EXAMPLE 2

Figure 5:
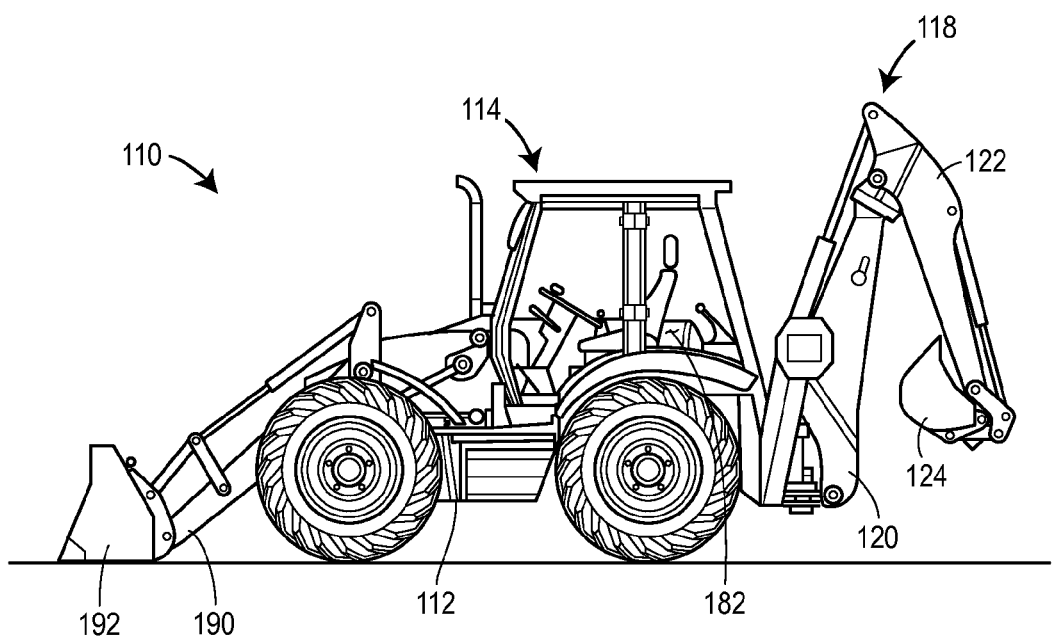
FIG. 5 is a schematic view of part of an alternative material handling machine for use in a method according to the present invention.

With reference to FIG. 5 there is shown a material handling machine 110 including a chassis 112, an operator cab 114. Attached to the chassis is an arm assembly 118 which includes a first arm in the form of a boom 120, a second arm in the form of a dipper 122 and a ground engaging implement in the form of a bucket 124. Machine 110 also includes a front loader arm 190 which includes a shovel 192.

As will be appreciated the machine 110 is a back hoe loader (BHL). Operation of the arm assembly 118 (known as the back hoe) is similar to operation of the arm assembly 18 of machine 10. Operation of the front loader arm 190 and shovel 192 is well known in the art, but in summary hydraulic rams are able to lift and lower the front loader arm 191 and further hydraulic rams are able to "crowd" or "dump" shovel 192 relative to the front loader arm 190.

The back hoe loader 110 includes a monitoring unit 181.

In this example the back hoe loader 110 replaces the machine 10 (as indicated by the chain dotted lines of FIG. 3) when considering FIG. 3.

EXAMPLE 2a

The computer 72 receives information from the database 74 concerning an object, in this case, an underground gas pipeline 4 positioned 2 meters below the ground. Computer 72 receives information from the machine indicating that the machine has a back hoe capable of reaching 3 meters below ground level, the back hoe loader is stationary with an engine speed that is relatively high and relatively constant and with an oil pressure and hydraulic system which is varying with time.

The computer can therefore determine that the back hoe loader is being used to dig ground with the back hoe.

The computer can determine that the maximum depth of back hoe (3 meters) is lower than the depth of the gas pipeline (2 meters). The computer can determine that the back hoe loader is being operated in the vicinity of the pipeline. Accordingly, there is a raised probability that damage to the pipeline from the bucket of the back hoe loader might occur. Under these circumstances the computer 72 issues a warning to the operator 76 in charge of the pipeline. Operator 76 can then instruct someone to travel to the location of the back hoe loader (either by helicopter or car etc.) to instruct the operator of the back hoe loader to stop digging that area.

EXAMPLE 2b

The computer 72 receives information from the database 74 concerning an object, in this case an underground gas pipeline 4 positioned 2 meters below ground. The computer receives information from the back hoe loader 110. In this case the back hoe loader is moving backwards and forwards relatively short distances (for example 20 meters). The engine speed is varying. Oil pressure within the hydraulic system is varying. The computer 72 uses an algorithm to determine that this indicative of the back hoe loader being used to load material via the shovel 192. Typically shovels 192 load material from ground level, but are not used to dig into the ground. Accordingly, whilst the machine may be in the vicinity of the gas pipeline, because the front loader arm and shovel are being used (and the backhoe is not being used), then the likelihood of damage occurring to the pipeline positioned 2 meters below ground level is low and hence no warning need be issued.

EXAMPLE 2c

The computer 72 receives information from the database 74 concerning an object, in this case an underground gas pipeline 4 positioned 2 meters below ground. The computer 72 receives information from the back hoe loader 110. The computer determines that the back hoe loader 110 is moving at 30 mph, along a generally straight path. The engine speed is relatively high and relatively constant. The oil pressure in the hydraulic system is low and not varying with time. The computer 72 uses an algorithm to determine from this information that the back hoe loader is "roading" i.e. being driven from one site or location to another site or location. Whilst the back hoe loader 110 may remain in close proximity to the gas pipeline during "roading" (for example where the backhoe loader is being driven along a road which lies close to and parallel to the gas pipeline 4), nevertheless the computer 72 can determine that the likelihood of damage being done to the pipeline is low (since the backhoe is not being used) and hence no warning need be issued.

EXAMPLE 2d

Computer 72 receives the information from the database 74 concerning an object, in this case an underground gas pipe 4 positioned 2 meters below the ground.

The computer 72 receives information from the back hoe loader 110. In this case the back hoe loader is travelling at 50 mph along a generally straight path. The engine speed is 0 rpm, the oil pressure within the hydraulics system is 0 psi. Accordingly, the computer 72 can determine that the back hoe loader 110 is being transported on a transporter (e.g. lorry or the like) from one location to another location. In particular the maximum speed of the back hoe loader is 30 mph and hence the computer 72 can determine that the backhoe loader is not travelling under its own power. The computer 72 determines that the likelihood of damage to the pipeline is low and accordingly no warning is issued.

In the examples above, the computer 72 is positioned remotely from the machine. In one example the computer 72 is under the control of the manufacturer of the machine 10 and 110. The operator 76 may be located remotely from machine 10/110 and also remotely from the manufacturer of machines 10/110. In one example the operator 76 will be a utility company.

The database 74 may be controlled by the utility company since it is the utility company that has the ability to update the database 74 as and when further pipelines are laid, or when existing pipelines become inactive.

In summary, in the examples above, computer 72 (under the control of the machine manufacturer) receives information from the machine 10/110 and database 74 and, in the event of a likelihood of damage occurring a warning is provided to the utility operator 76. It is the utility operator 76 which then takes action to halt operation of the machine 10/110.

Figure 4:
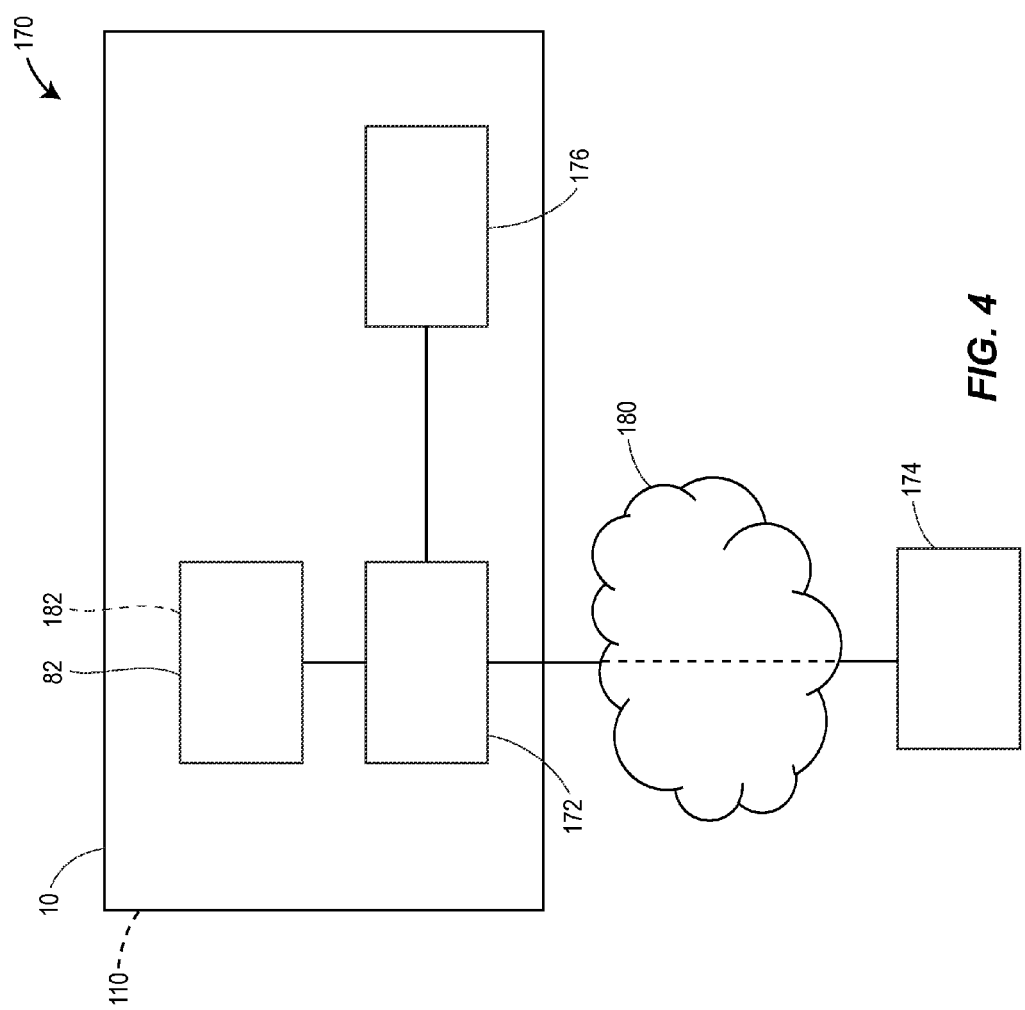
FIG. 4 shows a system architecture for implementing a method according to a second embodiment of the present invention.

In a further example the warning can be directly issued to the operator of the machine 10/110. Thus, as shown in FIG. 4 the machine 10/110 includes a computer 172. Computer 172 receives the information from database 174 via a wide area network (for example the internet). Computer 172 also receives information from the monitoring unit 82/182. In the event of a likelihood of damage occurring computer 172 issues a warning to the machine operator 176. The warning may be in the form of an audible, visual or vibratory alarm. In particular the warning may include a message relating to the object, for example a message such as "warning pipeline below machine" may be presented on a screen or the like indicating to the machine operator the nature of a hazard.

As mentioned above, the machine 10 is an excavator and machine 110 is a backhoe loader, though the invention is equally applicable to other types of material handling machines, for example tele-handlers.

As mentioned above, communication system 80 is wide area network, though other types of communication system could be used.

As mentioned above, the warning is issued to operator 76 or to operator 176. In further embodiments multiple warnings could be issued, for example a warning could be issued to both a utility company or the like and the machine operator.

In the examples above the objects to which damage might be caused are all below ground. However, the objects may be above ground, for example overhead cables 8 mounted on poles or pylons 6. Whilst the overhead cables 8 are visible to the operator of the machine, nevertheless when the operator is concentrating on digging a trench or the like it is easy for the operator to forget that the cables 8 are near and accordingly it is sometimes possible to damage cables 8 when swinging the bucket 24/124 to dump some spoil. A system can be used to warn of possible damage to overhead cables or the like. In particular if the overhead cables are six meters above ground and the maximum reach of the bucket 24/124 above ground is only 3 meters, then it is not necessary to issue a warning. However, if the bucket can reach high enough to damage the cables than a warning may be sent, in particular a warning to the machine operator may be presented on the screen or the like such as "warning—overhead cables". This may act to remind the operator of the cables.

As mentioned above, monitoring unit 82 that collects data from the machine 10 includes data relating to the type of machine, the location of the machine, the engine speed of the machine and the pressure of oil in the hydraulic system of the machine. Further embodiments more data can be collected or less data can be collected. In particular in order to determine what he machine is doing it is not necessary to monitor hydraulic oil pressure. Other ways of determining what the machine is doing can be used, for example switches or the like can determine what the machine is being used for, and/or the engine torque can be used to determine what the machine is being used for.

As described above the example of the Global Navigation Satellite System was GPS. Other Global Navigation Satellite Systems could be used, for example GLONASS or Galileo. Alternatively, a regional navigation system could be used.

In the examples described above, the material handling machines 10, 100 included arm assemblies 18, 118 having first arms 20, 120 and second arms 22, 122. In alternative embodiments of the invention, the material handling machine may include an arm assembly having a single arm. In some embodiments, the single arm may extend and retract telescopically.

In the examples described above, the arm assemblies 18, 118 include ground engaging implements in the form of buckets 24, 124. It will be understood that in alternative embodiments of the invention, the arm assembly may include any ground engaging or ground moving implement, for example a bucket, a shovel, a fork, a tine or a hydraulic hammer. It will also be understood that the arm assembly may include an implement that moves ground from one above-ground position to another above-ground position, for example a bucket, a shovel, a fork, a tine or a platform. In some embodiments, the implement may be telescopically mounted on the arm assembly.

In the examples described above, the arms assemblies 18, 118 are backhoes. In alternative embodiments of the invention, the arm assembly may be a front loader arm assembly or a tele-handler arm assembly, in particular a telescopic tele-handler arm assembly.

In Example 1 described above, the computer monitors the hydraulic pressure and determines how it changes with time. In alternative embodiments, the computer may monitor in which components of the machine the hydraulic pressure is changing.

The invention claimed is:

1. A computer-implemented method for providing a warning including the steps:
   obtaining data relating to the location of an object;
   obtaining data relating to the location of a material handling machine;
   estimating a probability of damage occurring by using the computer to compare the location of the material handling machine to the location of the object;
   providing, via the material handling machine, a warning, based on the estimate, to an operator of the material handling machine, the warning comprising an alarm; and
   determining the type of the material handling machine, and wherein estimating the probability of the damage occurring is based on the type of the material handling machine.

2. A method according to claim 1, wherein the location of the object is below ground level, or wherein the location of the object is above ground level.

3. A method according to claim 2, further including obtaining data relating to the distance of the object below or above the ground level, wherein estimating the probability of damage occurring is based on the data relating to the distance of the object below or above the ground level.

4. A method according to claim 1, further including communicating, using a communication system, the data relating to the location of the object to the computer.

5. A method according to claim 4, further including communicating, using the communication system, the data relating to the location of the material handling machine to the computer.

6. A method according to claim 4, further including communicating, using the communication system, the warning to and/or from the material handling machine.

7. A method according to claim 1, wherein the material handling machine is an excavator, or a backhoe loader, or a tele-handler.

8. A method according to claim 1, wherein the material handling machine has a material handling implement, the method further including determining the position of the material handling implement relative to the rest of the material handling machine, wherein estimating the probability of the damage occurring is based on the determined position of the material handling implement relative to the rest of the material handling machine.

9. A method according to claim 8, wherein the material handling machine has a hydraulic system that manoeuvers the material handling implement and the method includes determining the pressure in the hydraulic system, wherein estimating the probability of the damage occurring is based on the pressure in the hydraulic system.

10. A method according to claim 8, wherein the material handling machine comprises a ground-engaging material handling implement.

11. A method according to claim 8, wherein determining the position of the material handling implement relative to the rest of the material handling machine comprises determining the height of the material handling implement relative to the rest of the material handling machine.

12. A method according to claim 1, further including determining whether the material handling machine is moving, wherein estimating the probability of the damage occurring is based on whether the material handling machine is moving.

13. A method according to claim 1, wherein the material handling machine has an engine and the method further includes determining whether the engine is running, wherein estimating the probability of the damage occurring is based on the whether the engine is running.

14. A method according to claim 1, wherein the alarm comprises an audible, visual or vibration alarm, or wherein providing the warning includes sending a message containing data about the estimate of the probability of damage occurring to and/or from the material handling machine.

15. A method according to claim 1, further including determining the speed and/or direction at which the material handling machine is moving, wherein the probability of the damage occurring is estimated based on the determined speed and/or direction.

16. A method according to claim 1, wherein the material handling machine has an engine and the method further includes determining the speed at which the engine is running, wherein the probability of the damage occurring is estimated based on the determined speed.

17. A material handling machine including:
   a processor that is configured to:
   receive data relating to the location of an object and data relating to the location of the material handling machine;
   compare the location of the material handling machine and the location of the object;
   estimate a probability of damage occurring based on the comparison; and
   provide a warning based on the estimate to a user of the material handling machine, the warning comprising an alarm.

18. A system for providing a warning including:
   a processor that is configured to:
   receive data relating to the location of an object and data relating to the location of a material handling machine;
   compare the location of the material handling machine and the location of the object;
   estimate a probability of damage occurring based on the comparison; and
   provide, via the material handling machine, a warning based on the estimate to a user of the material handling machine, the warning comprising an alarm.

19. A non-transitory computer-readable storage medium storing instructions which when executed by a processor causes the processor to execute the steps of:
   comparing data relating to the location of an object and data relating to the location of a material handling machine;
   estimating the probability of damage occurring based on the comparing; and
   providing, to a user of the material handling machine, a warning based on the estimate, the warning comprising an alarm.

20. A method according to claim 19, wherein providing the warning comprises presenting, to the user of the material handling machine, the warning via a user interface.

* * * * *